(12) United States Patent
Ghuli et al.

(10) Patent No.: US 10,320,971 B2
(45) Date of Patent: Jun. 11, 2019

(54) CALL LOG MANAGEMENT FOR MULTIPLE COMMUNICATION DEVICES USING THE SAME ADDRESS OF RECORD

(71) Applicant: Avaya Inc., Santa Clara, CA (US)

(72) Inventors: Basavraj Ghuli, Pune (IN); Dinesh Mude, Pune (IN); Gurpreet Khalsa, Pune (IN); Tarush Abhaya Jain, Pune (IN)

(73) Assignee: Avaya Inc., Santa Clara, CA (US)

( * ) Notice: Subject to any disclaimer, the term of this patent is extended or adjusted under 35 U.S.C. 154(b) by 239 days.

(21) Appl. No.: 14/969,831

(22) Filed: Dec. 15, 2015

(65) Prior Publication Data

US 2017/0171384 A1    Jun. 15, 2017

(51) Int. Cl.
*H04M 3/22* (2006.01)
*H04M 3/42* (2006.01)
*H04L 29/06* (2006.01)
*H04M 3/46* (2006.01)

(52) U.S. Cl.
CPC .... *H04M 3/42059* (2013.01); *H04L 65/1059* (2013.01); *H04L 65/1069* (2013.01); *H04L 65/1076* (2013.01); *H04L 65/1096* (2013.01); *H04M 3/2218* (2013.01); *H04M 3/42263* (2013.01); *H04M 3/42195* (2013.01); *H04M 3/465* (2013.01); *H04M 2203/554* (2013.01)

(58) Field of Classification Search
CPC ......... H04M 3/42218; H04M 3/44263; H04M 3/42059; H04M 3/2218; H04W 4/16; H04L 65/1006

USPC ........................................................ 455/415
See application file for complete search history.

(56) References Cited

U.S. PATENT DOCUMENTS

| | | | |
|---|---|---|---|
| 2003/0185365 A1* | 10/2003 | Mansfield | H04M 1/56 379/142.01 |
| 2009/0163244 A1 | 6/2009 | Parkkinen et al. | |
| 2010/0325249 A1* | 12/2010 | Brunson | H04L 29/12122 709/221 |
| 2015/0222744 A1* | 8/2015 | Azim | H04M 3/2218 379/140 |

* cited by examiner

*Primary Examiner* — Marcus Hammonds
(74) *Attorney, Agent, or Firm* — Sheridan Ross P.C.

(57) ABSTRACT

A request to establish a communication is received. For example a request to establish a voice communication is received. The request can be forked to a plurality of communication devices based on an address of record. The address of record is an address associated with multiple communication devices of the same user. The request to establish the communication is stored in a call log entry in a call log. An event associated with the call log entry is received. The event is based information associated with a calling device or a communication device that is not initially part of an established communication session. In response to receiving the event associated with the call log entry, the call log entry in the call log is updated based on the event. The updated call log or the updated call log entry is the sent to the plurality of communication devices.

20 Claims, 6 Drawing Sheets

CALL LOG MANAGEMENT FOR MULTIPLE COMMUNICATION DEVICES USING THE SAME ADDRESS OF RECORD

TECHNICAL FIELD

The systems and methods disclosed herein relate to communication devices and in particular to management of call logs in communication devices.

BACKGROUND

As communication devices have evolved, the communication devices started including a display that is used to display a call log. A call log is a useful feature that allows a user to see different calls, such as, outgoing calls, received calls, missed calls, and the like. With the advent of modern communication protocols, such as, the Session Initiation Protocol (SIP), a user may have a single Address of Record (AoR) that is associated multiple communication devices. For example, the user may have a desktop computer and a cell phone associated with the AoR. When a call is received using the AoR, call logs between the two communication devices are only synchronized under certain conditions. For example, U.S. Patent Application No 2009/0163244 discloses that when a call is answered by one communication device, a missed call log of a second communication device may be changed to answered.

BRIEF SUMMARY

Systems and methods are provided that synchronize call logs specific between communication devices using a single AoR.

A request to establish a communication is received. For example a request to establish a voice communication is received. The request can be forked to a plurality of communication devices based on an address of record. The address of record is an address associated with multiple communication devices of the same user. The request to establish the communication is stored in a call log entry in a call log.

An event associated with the call log entry is received. The event is based information associated with a calling device or a communication device that is not initially part of an established communication session. For example, another party may bridge on the established communication session. In response to receiving the event associated with the call log entry, the call log entry in the call log is updated based on the event. The updated call log or the updated call log entry is the sent to the plurality of communication devices. This way, each of the communication devices can have the same call log, and the call logs of the various communication devices can be synchronized effectively.

DETAILED DESCRIPTION

Figure 1:
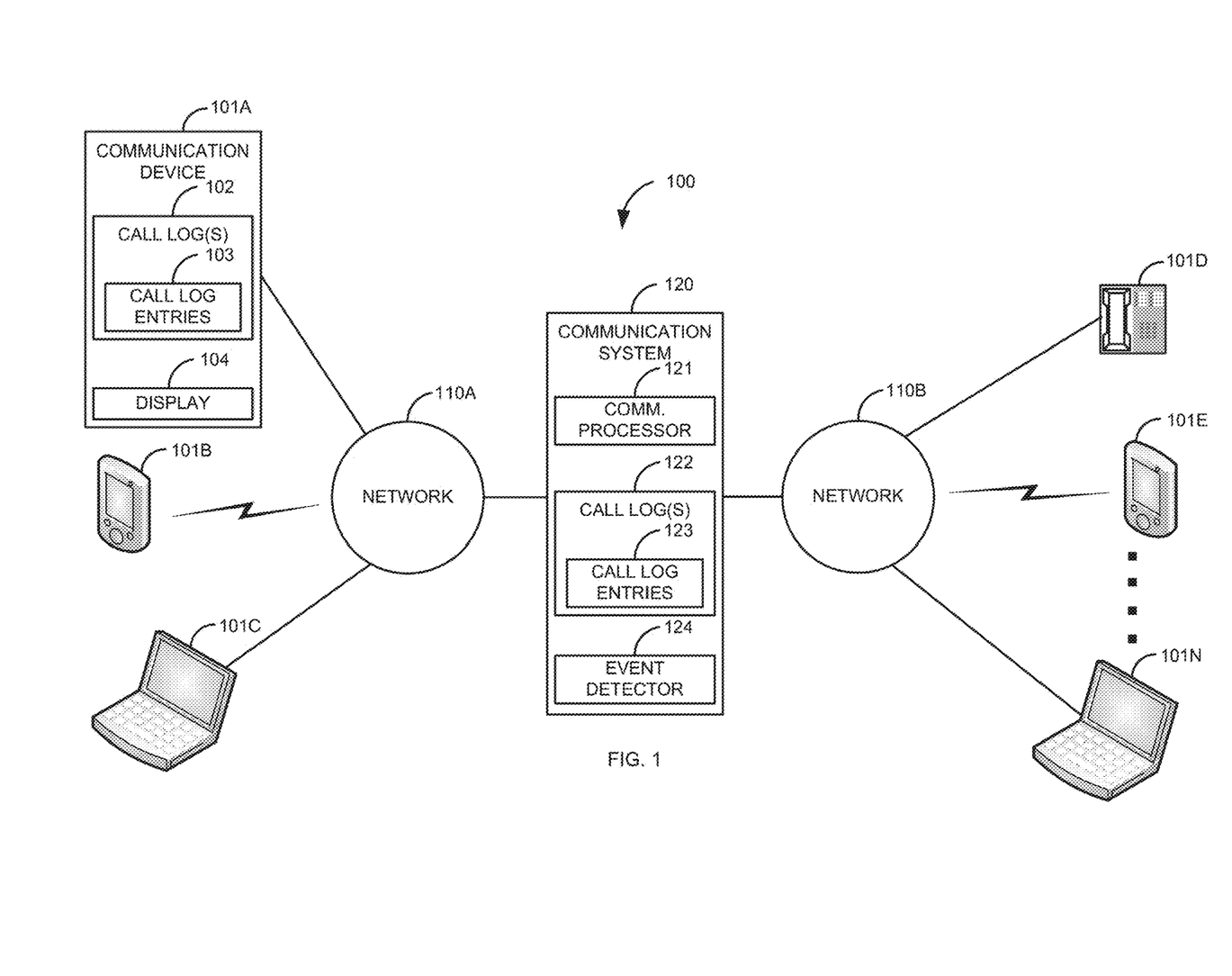
FIG. 1 is a block diagram of a first illustrative system for synchronizing call log entries for multiple communication devices using a single Address of Record (AoR).

FIG. 1 is a block diagram of a first illustrative system 100 for synchronizing call log entries 103 for multiple communication devices 101 using a single Address of Record (AoR). The first illustrative system 100 comprises communication devices 101A-101N, networks 110A-110B, and a communication system 120.

The communication devices 101A-101N can be or may include any hardware device that can communicate on the networks 110A-110B, such as a Personal Computer (PC), a telephone, a video system, a cellular telephone, a Personal Digital Assistant (PDA), a tablet device, a notebook device, a smart phone, a server, and/or the like. As shown in FIG. 1, any number of communication devices 101A-101N may be connected to the networks 110A-110N.

The communication device 101A also comprises a call log 102 and a display 104. The call log 102 is a call log 102 that reflects various communications received and sent using an AoR. Each of the communications is typically represented in the call log 102. An AoR is a common address that a user can define to send and receive different kinds of communications, such as voice, video, Instant Messaging (IM), email, and multi-media communications. The AoR can have multiple communication devices 101 of the user associated with the AoR. For example, the AoR may have a user's desktop phone, the user's notebook computer, and the user's cell phone associated with the AoR. In FIG. 1, for simplicity, only the communication device 101A is shown to comprise the call log 102. However, each of the communication devices 101B-101N can also have a respective call log 102.

The display 104 can be any hardware device that can be used to display information to a user, such as a Light Emitting Diode (LED) display, a Cathode Ray Tube, a plasma display, a Liquid Crystal Display (LCD), and/or the like. The display 104 is used to display the call log 102. In FIG. 1, for simplicity, only the communication device 101A is shown to comprise the display 104. However, each of the communication devices 101B-101N can also have a respective display 104.

The networks 110A-110B can be or may include any collection of communication equipment that can send and receive electronic communications, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The network 110 can use a variety of electronic protocols, such as Ethernet, Internet Protocol (IP), Session Initiation Protocol (SIP), Integrated Services Digital Network (ISDN), H.323, video protocols, Instant Messaging (IM) protocols, and/or the like. Thus, the networks 110A-110B are electronic communication networks configured to carry messages via packets and/or circuit switched communications. In FIG. 1, two networks 110A and 110B are shown. However, the system of FIG. 1 may only comprise a single network 110 or more than two networks 110.

The communication system 120 can be any hardware device that executes software for managing communications, such as a Private Branch Exchange (PBX), a communication server, a central office switch, a router, a proxy server, and/or the like. The communication system 120 can manage various types of communications, such as, voice communications, video communications, Instant Messaging (IM) communications, text communications, virtual reality communications, multi-media communications, and/or the like.

The communication system 120 further comprises a communication processor 121, call log(s) 122, and an event detector 124. The communication processor 121 can be any hardware device that executes software for routing and/or managing communications, such as a Digital Signaling Processor (DSP), a communication router, a communication manager, a session manager, and/or the like.

The call log(s) 122 are individual call logs 122 for a particular user associated with an AoR. The call log(s) 122 are used to synchronize changes to the call logs 102 for communication devices 101 associated with the AoR. The call logs 122 may comprise separate call logs 122 for multiple users of the communication system 120, while the call logs 102 are for a specific user of the communication device 101.

The event detector 124 can be any hardware/software that can detect various events related the communications. For example, the event detector 124 may detect different types of events associated with communications, such as events associated with voice calls, video calls, IM calls, multimedia communications, virtual reality communications, and/or the like. In FIG. 1, the event detector 124 is shown only in the communication system 120. However, in some embodiments, the event detector 124 may be distributed between the communication device 101A and the communication system 120.

Figure 2:
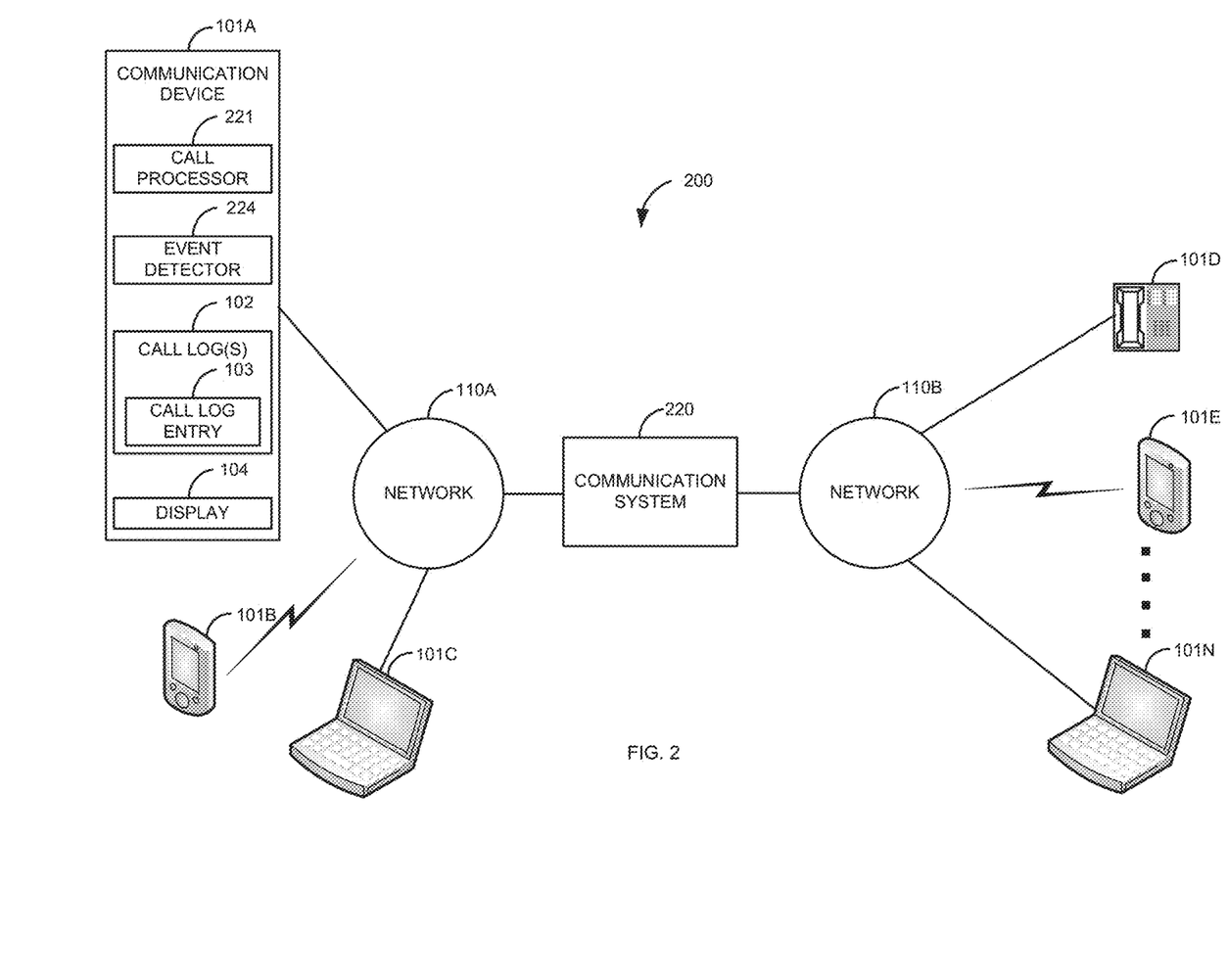
FIG. 2 is a block diagram of a second illustrative system for synchronizing call log entries for multiple communication devices using a single Address of Record (AoR) in a peer-to-peer environment.

FIG. 2 is a block diagram of a second illustrative system 200 for synchronizing call log entries 103 for multiple communication devices 101 using a single Address of Record (AoR) in a peer-to-peer environment. The second illustrative system 200 comprises the communication devices 101A-101N, the networks 110A-110B, and the communication system 220.

The communication device 101A comprises the call log 102, the display 104, a communication processor 221, and an event detector 224. The communication processor 221 can be any hardware coupled with software that can be used to help establish a communication. Although not shown for simplicity, the communication devices 101B-101N can also comprise a corresponding communication processor 221.

The event detector 224 can be or may include any hardware/software that can detect events associated with communications. The event detector 224 works similar to the event detector 124, except that the event detector 224 works in a peer-to-peer environment. In FIG. 2, the event detector 224 is shown only in the communication device 101A. However, in some embodiments, the event detector 224 may be distributed between the communication device 101A and the communication system 220. Although not shown, the event detector 224 may be included in each of the communication devices 101A-101N.

Figure 3:
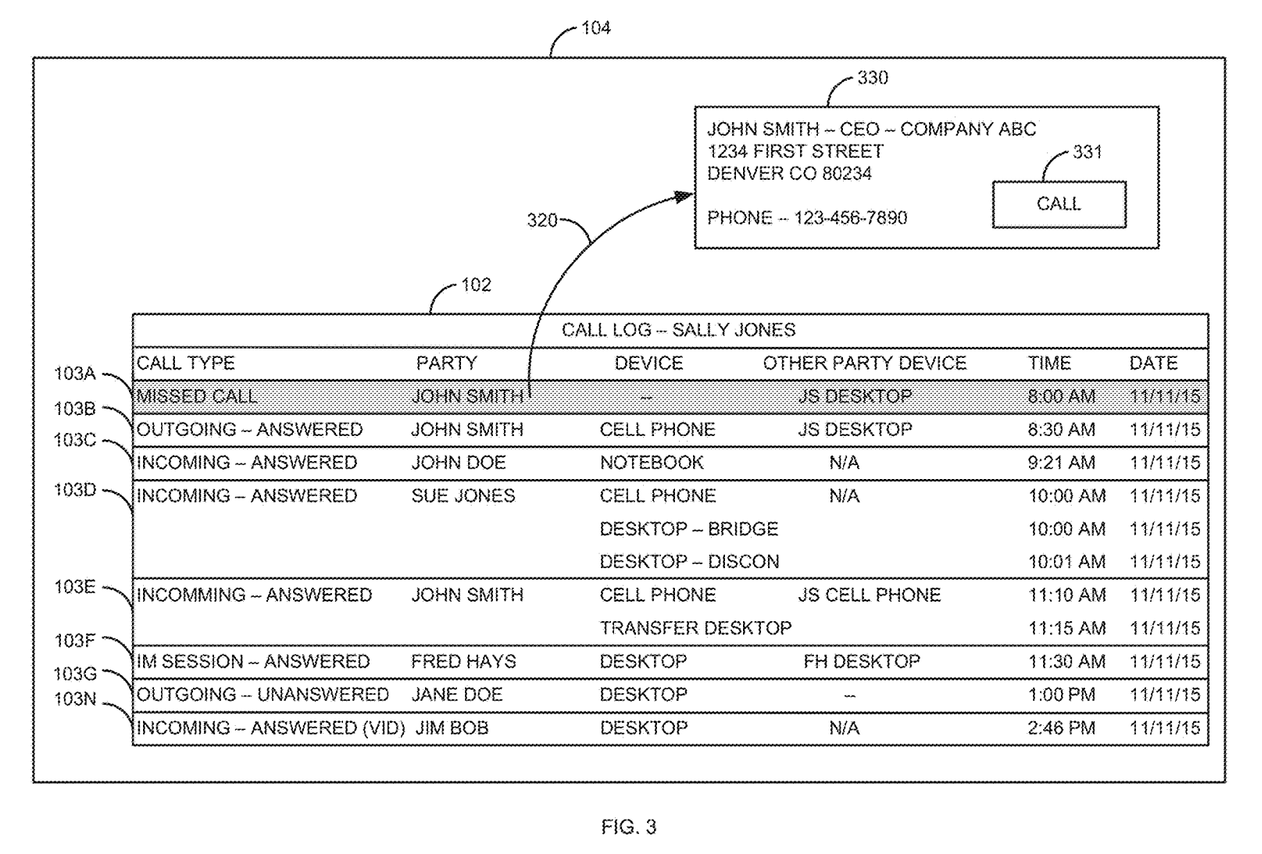
FIG. 3 is a diagram of an exemplary call log that is displayed by a communication device.

FIG. 3 is a diagram of an exemplary call log 102 that is displayed by a communication device 101 in the display 104. FIG. 3 comprises the display 104, the call log 102, and a call log entry window 330.

The call log 102 of FIG. 3 is based on a single AoR for Sally Jones. In FIG. 3, Sally Jones has three communication devices associated with Sally Jones' AoR: 1) a desktop, 2) a notebook, and 3) a cell phone. When a communication is made to Sally Jones' AoR, the communication is forked in parallel to each of the three communication devices 101 associated with Sally's AoR. In addition, the parties John Smith and Fred Hays also have multiple communication devices associated with a single AoR.

The call log 102 is an example of a call log 102 that is displayed on Sally Jones' desktop. The call log 102 comprises call log entries 103A-103N.

The call log entries 103A-103N are different examples of communications for an AoR. The call log entry 103A is for a voice call from John Smith that was missed. The call was made from John Smith's desktop (one of multiple devices associated with John Smith's AoR) at 8:00 AM on 11/11/2015.

The call log entry 103B is for an outgoing voice call that was made from Sally Jones' cell phone (in this example, displayed on Sally Jones' desktop). The outgoing call was answered by John Smith's desktop communication device 101. The outgoing call for the call log entry 103B was made at 8:30 AM on 11/11/2015.

The call log entry 103C is for an incoming voice call from John Doe that was answered at Sally Jones' notebook communication device 101. The voice call for the call log entry 103C was received at 9:21 AM on 11/11/2015.

The call log entry 103D is for an incoming voice call from Sue Jones that was answered at Sally Jones' cell phone. The voice call for the call entry 103D was received at 10:00 AM on 11/11/2015. In addition, the call log entry 103D shows that Sally Jones' desktop also bridged onto the call at 10:00 AM on 11/11/2015. Since the call was forked and rings at all three of Sally Jones' communication devices 101 at the same time, the call may be answered by Sally Jones at her cell phone and by another person at Sally Jones' desktop (at the time of the initial voice call or later on). The call log entry 103D allow Sally to know that there is an additional party (perhaps an eavesdropper) listening in on the voice communication with Sue Jones. The call log entry 103D also shows that the bridge connection was disconnected at 10:01 on 11/11/2015.

The call log entry 103E is for an incoming voice call from John Smith's cell phone that was answered at Sally Jones' cell phone. The voice call was received at 11:10 AM on 11/11/2015. The call log entry 103E also shows that the call was transferred to Sally Jones' desktop at 11:15 AM on 11/11/2015. When the call is transferred, the call is basically two calls. The initial incoming call, and the call from the answering communication 101 to the desktop communication device 101. This is reflected in the call log 103E.

The call log entry 103F is for an IM session that was answered at Sally Jones' desktop. The IM session was with Fred Hays at Fred Hays' desktop. The IM session started at 11:30 AM on 11/11/2015.

The call log entry 103G is for an outgoing voice call to Jane Doe that was not answered. The outgoing voice call to Jane Doe was at 1:00 PM on 11/11/2015.

The call log entry 103N is for an incoming video communication from Jim Bob that was answered at Sally Jones' desktop. The incoming video communication from Jim Bob was received at 2:46 PM on 11/11/2015.

For each of the call log entries 103A-103N, the user can acknowledge the call log entry 103. For example, the user can click (using a mouse) on the call log entry 103A, in step 320 to get additional information about the calling party as shown in the call log entry window 330; in this case, the calling party for the missed call is John Smith. Sally Jones can then click on the call button 331 to call John Smith. Once a call log entry 103 has been acknowledged, the call log entry 103 is shown with a different color (e.g., a darker grey color as shown in the call log entry 103A).

Alternatively, Sally Jones can acknowledge (e.g., indicate that she is aware of the call log entry 103) by selecting the call log entry 103, by selecting a call log entry check box (not shown), and/or the like.

As each of Sally Jones' communication devices 101 initiates, receives, bridges, and/or transfers (and the like) a communication, the call logs 102 of each of Sally Jones' communication devices 101 may be updated. For example, Sally Jones may have been at her desktop, but unavailable, to answer the call from John Smith in the call log entry 103A. After the call is missed, the call log entry 103A is sent to each the call logs 102 for each of Sally Jones' communication devices 101. Sally Jones is now away from her desktop, but has the call log entry 103A is displayed in her cell phone's call log 102. Sally selects (step 320) the call log entry 103A on her cell phone. The call log entry window 330 is displayed to Sally Jones. Sally Jones clicks on the call button 331 to call John Smith. This results in the call log entry 103B being displayed in the call log 102 for each of Sally Jones' communication devices 101 (the desktop, the notebook, and the cell phone).

Figure 4:
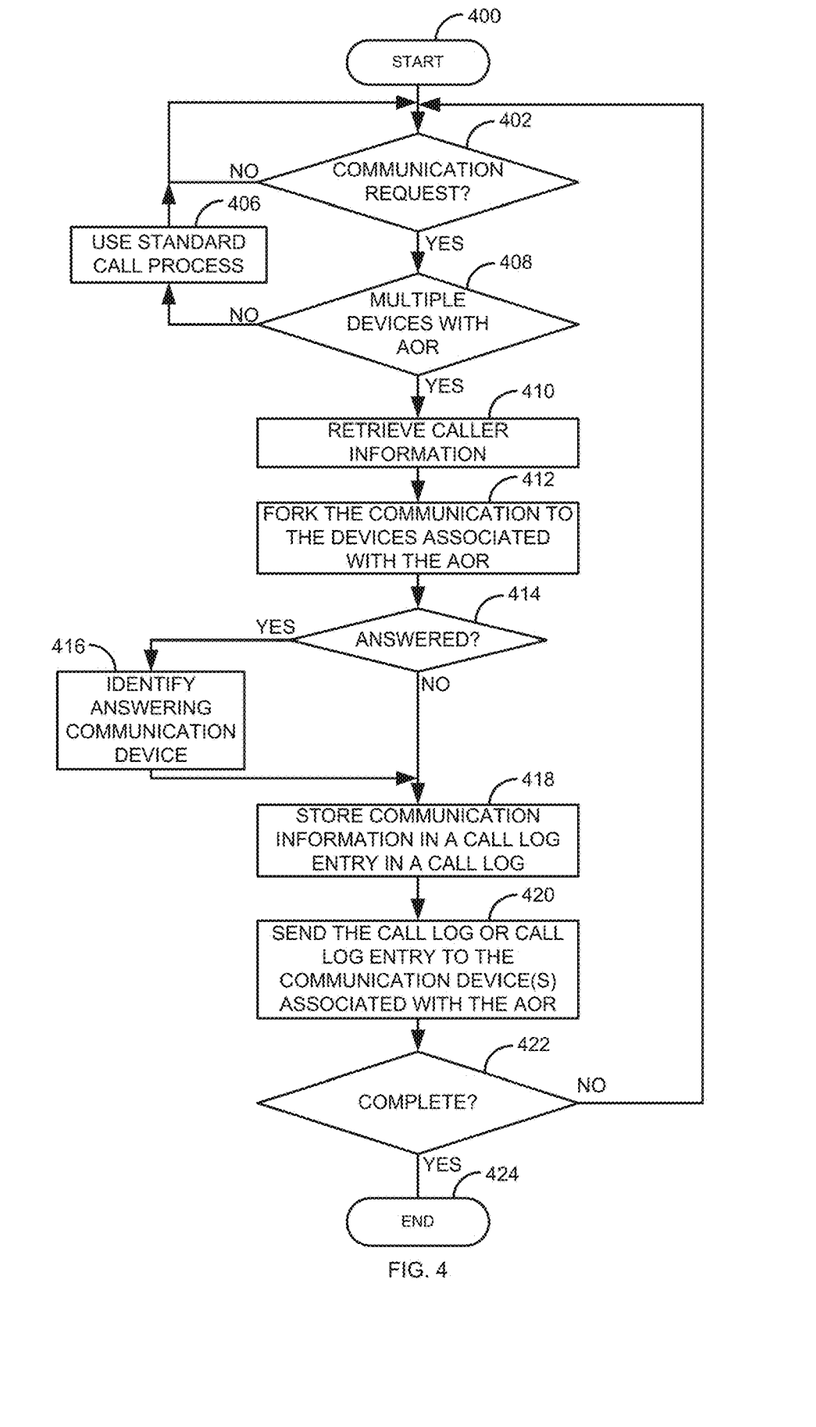
FIG. 4 is a flow diagram of a process for synchronizing call log entries for multiple communication devices using a single Address of Record (AoR).
Figure 5:
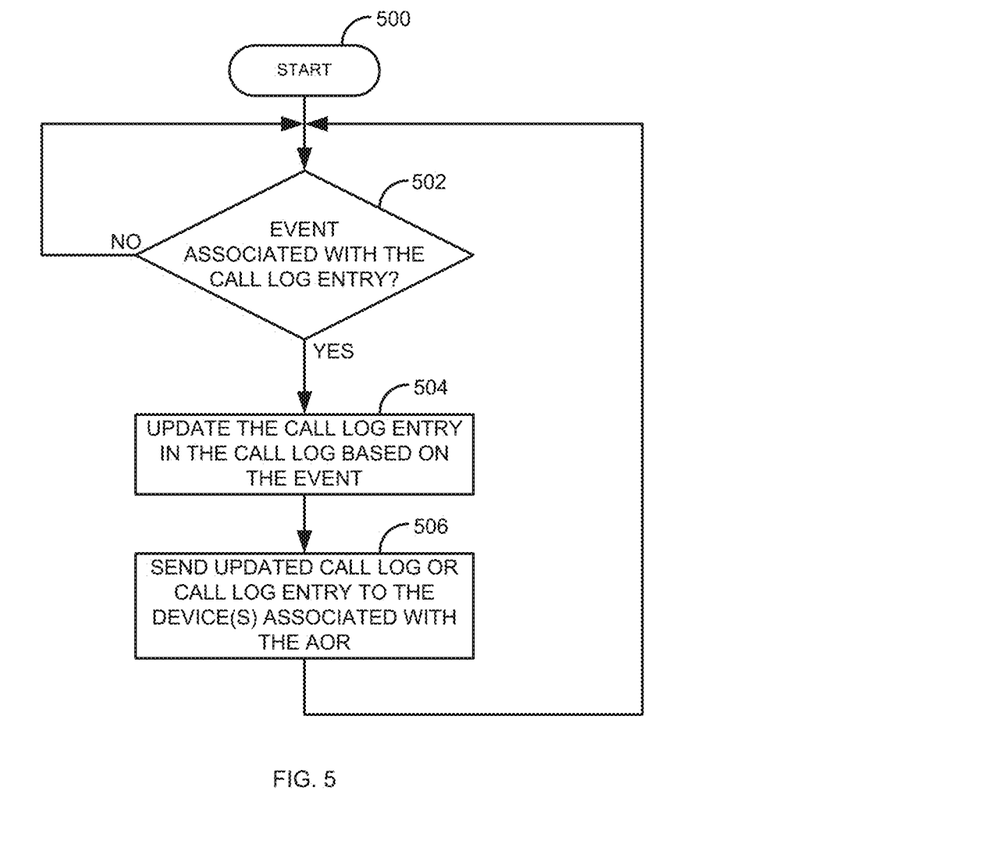
FIG. 5 is a flow diagram of a process for determining events for synchronizing call log entries for multiple communication devices using a single Address of Record (AoR).
Figure 6:
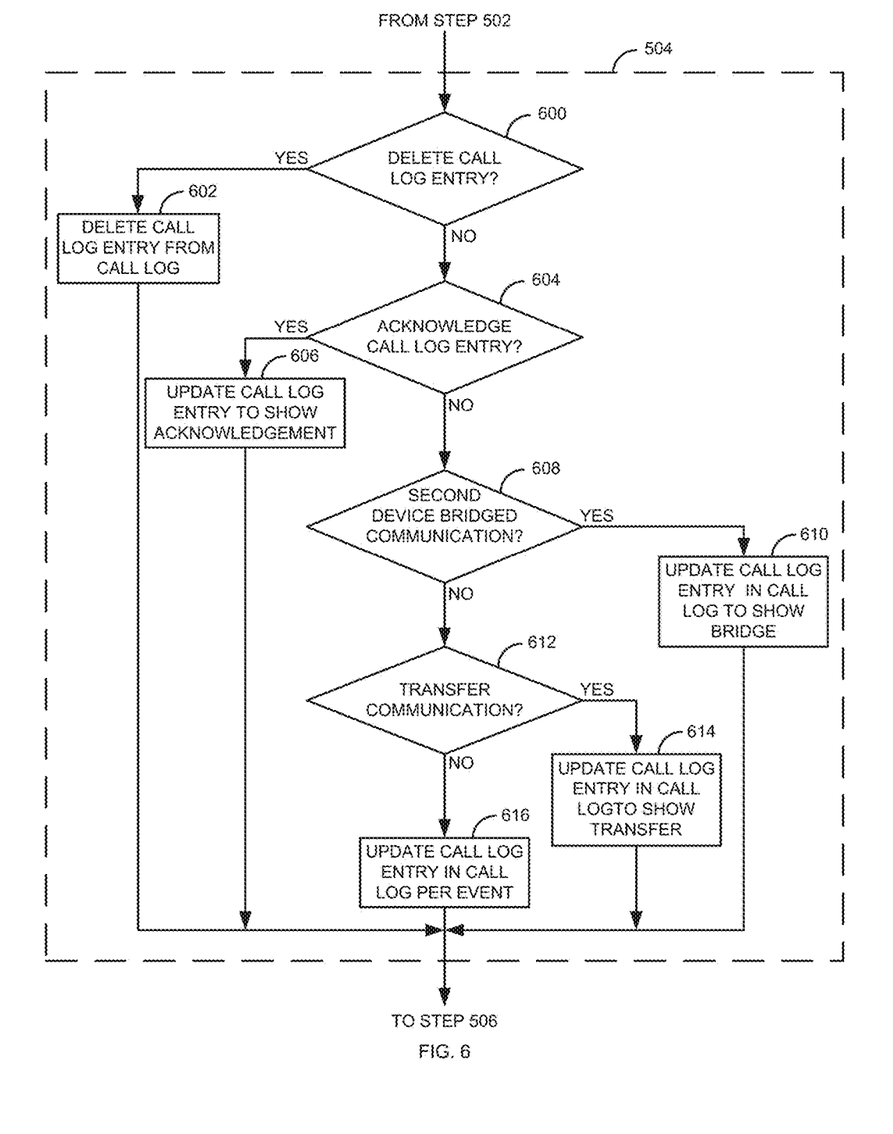
FIG. 6 is a flow diagram for determining events for updating call log entries.

FIG. 4 is a flow diagram of a process for synchronizing call logs 102/122 for multiple communication devices 101 using a single Address of Record (AoR). Illustratively, the communication devices 101A-101N, the communication systems 120/220, the communication processors 121/221, and the event detectors 124/224 are stored-program-controlled entities, such as a computer or processor, which performs the method of FIGS. 4-6 and the processes described herein by executing program instructions stored in a computer readable storage medium, such as a memory or disk. Although the methods described in FIGS. 4-6 are shown in a specific order, one of skill in the art would recognize that the steps in FIGS. 4-6 may be implemented in different orders and/or be implemented in a multi-threaded environment. Moreover, various steps may be omitted or added based on implementation.

The process starts in step 400. The communication processor 121 waits, in step 402, to see if there is a request to establish a communication. For example, the request to establish the communication may be for a voice call, a video call, an IM call, a multi-media call, a virtual reality call, and the like. If a request to establish the communication is not received in step 402, the process repeats step 402.

Otherwise, if the request to establish the communication is received in step 402, the communication processor 121 determines, in step 408, if the AoR of the request to establish the communication has multiple associated communication devices 101. If there is only a single communication device 101 associated with the AoR, the process goes to step 406 and process the communication using standard known call processing.

Otherwise, if there are multiple devices associated with the AoR in step 408, the communication processor 121 retrieves caller information (if there is any) in step 410. For example, the communication processor 121 can get caller information using caller ID or based an AoR of the caller. In one embodiment, the AoR of the caller may have multiple communication devices 101 associated with the caller. The caller information can identify a specific communication device 101 associated with the caller's AoR.

The communication processor 121 forks the request to establish the communication in parallel to the communication devices 101 associated with the AoR in step 412. For example, if the SIP protocol were being used, the communication processor 121 can send a SIP INVITE to each of the communication devices 101A-101C in parallel. If the request to establish the communication is answered at one of the multiple communication devices 101, in step 414, the communication processor 121 identifies the communication device(s) 101 that answered the communication in step 416 and the process goes to step 418. Otherwise, if the communication is not answered (i.e., a missed call) in step 414, the process goes to step 418.

The information is stored in a call log entry 123 in the call log 122 in step 418. The information that is stored is whether the call was answered or missed, and the identify information of the caller/caller's device. The communication processor 121 sends the call log 122 or the call log entry 123 to the multiple communication device(s) 101 associated with the AoR in step 420. The multiple communication devices 101 then update their respective call logs 102. In another embodiment, the call log 122 or the call log entry 123 may be sent to a specific communication device(s) 101 associated with the AoR instead of being sent to all of the communication devices 101 associated with the AoR.

If the process is complete in step 422, the process ends in step 424. Otherwise, if the process is not complete in step 422, the process goes back to step 402.

To illustrate, consider the following example using the call log 102 and call log entry 103A as shown in FIG. 3. A voice call, from communication device 101D (John Smith's desktop) is received from John Smith using the AoR of Sally Jones in step 402. The communication processor 121 determines, in step 408, that the AoR of Sally Jones has three associated communication devices 101A-101C. The communication device 101A is Sally Jones' notebook. The communication device 101B is Sally Jones' cell phone. The communication device 101C is Sally Jones' desktop.

The communication processor 121 gets the caller information for John Smith in step 410. The caller information includes the caller's name and the caller's communication device (John Smith's desktop 101D). The communication processor 121 forks the voice call in parallel to each of the communication devices 101A-101C in step 412. The communication processor 121 sends the request to establish the voice communication by sending the initial request to each of the communication device 101A-101C in step 412. Each of the communication devices 101A-101C starts ringing. None of the communication devices 101A-101C answers the voice call from John Smith in step 414. The missed call and the caller's identity/communication device 101D is stored in the call log entry 123 in the call log 122 in step 418. The communication processor 121 sends the call log 123 or the call log entry 122 to each of the communication devices 101A-101C in step 420. The communication device 101C (Sally Jones' desktop) displays the call log 102 that shows the call log entry 103A with the missed call from John Smith's desktop (communication device 101D). The communication devices 101A-101B will also show the call log entry 103A.

A similar process is used if the call is answered. For example, the video call of call log entry 103N shows that the incoming video call from Jim Bob was answered at Sally Jones' desktop.

FIG. 5 is a flow diagram of a process for determining events for synchronizing call log entries 103/123 for multiple communication devices 101 using a single Address of Record (AoR). The process starts in step 500. The event detector 124 waits to receive an event associated with the call log entry 103/123 in step 502. The event received by the event detector 124 may be received from one or more of the communication devices 101 associated with the AoR or from the communication processor 121. In addition, the event may be received from other devices/systems, such as, a call log maintenance system (e.g., a system that periodically reduces the call log 102/122 size), an Interactive Voice Response (IVR) system, an IM server, a network router, a video event system, and/or the like. The event may based on any type of information associated with the communication/call log entry 103/123, such as deletion of a call log entry 103/123, acknowledging a call log entry 103/123, moving a call log entry 103/123, a reordering of the call log 102/122, having a second communication device 101 bridge on to the communication, a recording of the communication (i.e., a recorder bridging onto the communication), transferring the communication, a call drop of the communication based on congestion or loss of signal, a type of codec used in the communication, a route associated with the communication, a communication priority associated with the communication, a change of codec in the communication, a change of communication priority during the communication, detection of a video event in a video communication, detection of a Dual Tone Multi Frequency (DTMF) tone(s), and/or the like.

If an event is not received by the event detector 124 in step 502, the process of step 502 repeats. Otherwise, if an event is received in step 502, the event detector 124 updates the call log entry 123 in the call log 122 in step 504. The communication processor 121 sends the updated call log 122 or the updated call log entry 123 to the communication device(s) 101 (or a subset of the communication devices 101) associated with the AoR in step 506. For example, in one embodiment, the call log 122 may be sent to each of the communication devices 101 associated with the AoR. In other embodiments, only the call log entry 123 may be sent.

FIG. 6 is a flow diagram for determining events for updating call logs 102/122. The process of FIG. 6 is an exemplary embodiment for step 504 of FIG. 5. After receiving the event in step 502, the event detector 124 determines in step 600 if the event is to delete a call log entry 123. If the event is to delete the call log entry 123, the event detector 124 deletes the call log entry 123 from the call log 122 in step 602. The process then goes to step 506 where the updated call log 122 is sent to the communication device(s) 101 associated with the AoR.

If the event is not to delete a call log entry 123 in step 600, the event detector 124 determines if the event is to acknowledge a call log entry 123 in step 604 (e.g., as described in step 320). If the event is to acknowledge the call log entry 123 in step 604, the event detector 124 updates the call log entry 123 in the call log 122 to show the acknowledgment in step 606. The process then goes to step 506 where the updated call log 122 or call log entry 123 is sent to the communication device(s) 101 associated with the AoR.

If the event is not to acknowledge the call log entry 123 in step 604, the event detector 124 determines if the event is where a second communication device 101 has been bridged onto the communication in step 608. For example, if the second communication device 101 sends a SIP INVITE message to join the communication. If a second communication device 101 has been bridged onto the communication in step 608, the event detector 124 updates the call log entry 123 in the call log 122 to show the bridge in step 610. The process then goes to step 506 where the updated call log 122 or call log entry 123 is sent to the communication device(s) 101 associated with the AoR.

If the event is not where the second communication device 101 bridges onto the communication in step 608, the event detector 124 determines if the event is to transfer the communication to another communication device 101 in step 612. If the event is to transfer the communication to another communication device 101 in step 612, the event detector 124 updates the call log entry 123 in the call log 122 to show the transfer in step 614. The transfer may be to a communication device 101 associated with the user's AoR or a different communication device 101. For example, the user may have the communication on a cell phone and whish to transfer the call to their desktop when the user arrives in their office. The process then goes to step 506 where the updated call log 122 or call log entry 123 is sent to the communication device(s) 101 associated with the AoR.

The transferred may be later dropped. The dropped transferred call can be updated in the call log 122 to show the dropped transferred call.

If the event is not to transfer the communication, in step 612, the event detector 124 updates the call log entry 123 in the call log 122 per the event in step 616. The process then goes to step 506 where the updated call log 122 or call log entry 123 is sent to the communication device(s) 101. For example, the event may be to move a call log entry 123, to reorder the call log 122, to conference another communication device 101, to conference a recorder onto the communication, a call drop of the communication based on congestion or loss of signal, based a type of codec used in the communication, based a route associated with the communication, based a communication priority associated with the communication, based a change of codec in the communication, based a change of communication priority during the communication, based on the communication being forwarded, based on a video event in the communication, and/or the like. The process then goes to step 506 where the updated call log 122 or call log entry 123 is sent to the communication device(s) 101 associated with the AoR.

To illustrate consider the following examples. Assume that the communication was an incoming voice communication that was answered by Sally Jones using her cell phone as shown in call log entry 103D. At the same time, Sally Jones' assistant also answers the call at Sally Jones' desktop, which causes the call processor 121 to send the event to the event detector 124 in step 502. The steps 600 and 602 are negative. In step 608, the event is where the second communication device 101 bridges onto the voice communication. The event detector 124 updates the call log entry 103D in step 610. The communication processor 121 sends the updated call log 122 or the call log entry 103D to each of the communication devices 101A-101C in step 506.

In another example, Sally Jones at her cell phone (communication device 101B) deletes the call log entry 103E. The communication device 101B sends the event to the event detector 124. The event detector 124 receives the event to delete the call log entry 103E in step 502. The event detector 124 determines in step 600 that the event is to delete the call log entry 103E in step 600. The event detector 124 deletes the call log entry 103E from the call log 122 in step 602. The communication processor 121 sends the updated call log 122 to each of the communication devices 101A-101C in step 506 (or a message to delete the call log entry 103E).

In one embodiment, instead of sending the event to each of the communication devices 101A-101C in step 506, the communication processor 121 only sends the updated call log 122 or call log entry 123 to the communication devices 101A and 101C. The communication device 101A updates the call log 102 in the communication device 101A by deleting the call log entry 103E.

The above processes will also work for the system 200 described in FIG. 2. In FIG. 2, the event detector 224 is in the communication device 101. The call forking is accomplished by the communication system 220.

To illustrate, consider the same example described above where the call log entry 103E is deleted by Sally Jones on here cell phone (communication device 101B). The event detector 224 detects the event to delete call log entry 103E (step 502). The event detector 224 determines, in step 600, that the call log entry 103E is to be deleted. The event detector 224 in the communication device 101B deletes the call log entry 103E in step 602. The call processor 221 in the communication device 101B sends the updated call log 102 to the communication devices 101A and 101C in step 506.

The process of FIG. 2 will also work with events that are received from the communication system 220 or other systems. The event detector 224 receives the events from the communication system 220 (e.g., a call transfer event) and updates the call log 102. The event detector 224 the sends the updated call log 102 or call log entry 103.

The processes described above may be implemented using different protocols, such as, SIP, H.323, video protocols, IM protocols, and/or the like. For example, when the communication device 101A detects a request to change the call log 102 (e.g., by deleting a call log entry 103), the communication device 101A sends a SIP Publish message to the event detector 124/224. The event detector 124/224 in turn sends a SIP notify message with the updated call log 122/call log entries 123 to each of the communication devices 101 associated with the AoR.

Alternatively, if the event comes from the communication processor 121/221, the event detector 124/224 would send a SIP notify message to each of the communication devices 101 associated with the AoR (e.g., those communication devices 101 who have subscribed to receive the SIP notify message). For example, if a voice call is bridged by a second communication device 101, the event detector 124 would send the SIP notify message to each of the communication devices 101 associated with the AoR.

Of course, various changes and modifications to the illustrative embodiment described above will be apparent to those skilled in the art. These changes and modifications can be made without departing from the spirit and the scope of the system and method and without diminishing its attendant advantages. The following claims specify the scope of the disclosure. Those skilled in the art will appreciate that the features described above can be combined in various ways to form multiple variations of the disclosure. As a result, the disclosure is not limited to the specific embodiments described above, but only by the following claims and their equivalents.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that individual aspects of the disclosure can be separately claimed. As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

What is claimed is:

1. A system comprising:
   a microprocessor,
   a computer readable medium, coupled with the microprocessor and comprising microprocessor readable and executable instructions for a communication processor;
   the communication processor that, when executed by the microprocessor, receives a request to establish a communication with a first address of record, wherein the request to establish the communication is for an incoming call from a calling device of a caller and wherein the calling device of the caller is one of a plurality of communication devices associated with an address of record of the caller; retrieves information that identifies the calling device of the caller from the plurality of communication devices associated with the address of record of the caller, forks the communication request to a plurality of communication devices sharing the first address of record; stores the request to establish the communication and the information that identifies the calling device of the caller in a call log entry in a call log; and sends an updated call log or an updated call log entry to at least one of the plurality of communication devices; and
   an event detector that, when executed by the microprocessor, receives an event associated with the call log entry, wherein the event is based on information associated with the calling device of the caller or a communication device that is not initially part of an established communication session; and updates the call log entry in the call log in response to receiving the event associated with the call log entry.

2. The system of claim 1, wherein an individual communication device from the plurality of communication devices answers the communication and wherein the event detector updates the call log entry in the call log to identify the individual communication device that answered the communication.

3. The system of claim 2, wherein the event comprises at least one of the following:
   a call drop of the communication based on congestion or loss of a signal, a type of codec used in the communication, a route associated with the communication, a communication priority associated with the communication, a change of codec in the communication, or a change of the communication priority during the communication.

4. The system of claim 1, wherein the request to establish the communication is for an answered communication with a first one of the plurality of communication devices, wherein the event associated with the call log entry is identifying that a second communication device of the plurality of communication devices has bridged onto the communication, and wherein the event detector updates the call log entry in the call log to indicate the second communication device has bridged onto the communication.

5. The system of claim 4, wherein:
   the communication processor detects that the second communication device disconnected from the communication; and resends the updated call log or the updated call log entry to at least the first one of the plurality of communication devices; and
   the event detector updates the call log entry in the call log to indicate the second communication device disconnected from the communication in response to detecting that the second communication disconnected from the communication.

6. The system of claim 1, wherein the request to establish the communication is for an answered communication with a first one of the plurality of communication devices, wherein the event associated with the call log entry is the communication being transferred to another communication device or a second one of the plurality of communication devices, and wherein:
   the event detector updates the call log entry in the call log to indicate the detection of the communication being transferred to the other communication device or the second one of the plurality of communication devices; and
   the communication processor resends the updated call log or the updated call log entry to the at least the first one of the plurality of communication devices.

7. The system of claim 6, wherein the transferred communication ends and wherein:
   the event detector updates the call log entry to indicated that the transferred communication ended; and
   the communication processor resends the updated call or updated call log entry with the end of the transferred communication to the plurality of communication devices.

8. The system of claim 1, wherein:
   the event detector receives a request to override the updating of the call log and does not send the updated call log or the updated call log entry to the plurality of communication devices in response to receiving the request to override the updating of the call log.

9. The system of claim 1, wherein the event associated with the call log entry is based on a received Session Initiation Protocol (SIP) PUBLISH message and wherein sending the updated call log is accomplished by sending a plurality of SIP NOTIFY messages.

10. The system of claim 1, wherein:
    the event detector detects that a user has acknowledged the call entry; and
    the communication processor updates the call log entry to indicate that the call log entry has been acknowledged and sends the updated call log or the updated call log entry to the at least one of plurality of communication devices.

11. A method comprising:
receiving, by a processor, a request to establish a communication with a first address of record, wherein the request to establish the communication is for an incoming call from a calling device of a caller and wherein the calling device of the caller is one of a plurality of communication devices associated with an address of record of the caller;
retrieving, by the processor, information that identifies the calling device of the caller from the plurality of communication devices associated with the address of record of the caller;
forking, by the processor, the request to establish the communication to a plurality of communication devices based on the first address of record;
storing, by the processor, the request to establish the communication and the information that identifies the calling device of the caller in a call log entry in a call log;
receiving, by the processor, an event associated with the call log entry;
in response to receiving the event associated with the call log entry, updating, by the processor, the call log entry in the call log, wherein the event is based on information associated with the calling device of the caller or a communication device that is not initially part of an established communication session; and
sending, by the processor, the updated call log or the updated call log entry to at least one of the plurality of communication devices.

12. The method of claim 11, wherein an individual communication device from the plurality of communication devices answers the communication and wherein updating the call log entry in the call log comprises updating the call log entry to identify the individual communication device that answered the communication.

13. The method of claim 11, wherein the request to establish the communication is for an answered communication with a first one of the plurality of communication devices, wherein the event associated with the call log entry is identifying that a second communication device of the plurality of communication devices has bridged onto the communication, and wherein updating the call log entry in the call log comprises updating the call log entry to indicate the second communication device has bridged onto the communication.

14. The method of claim 13, further comprising:
detecting that the second communication device disconnected from the communication;
in response to detecting that the second communication device disconnected from the communication, updating the call log entry in the call log to indicate the second communication device disconnected from the communication; and
resending the updated call log or the updated call log entry to at least the first one of the plurality of communication devices.

15. The method of claim 11, wherein the request to establish the communication is for an answered communication with a first one of the plurality of communication devices, wherein the event associated with the call log entry is the communication being transferred to another communication device or a second one of the plurality of communication devices, and further comprising:
updating the call log entry in the call log to indicate the detection of the communication being transferred to the other communication device or the second one of the plurality of communication devices; and
resending the updated call log or the updated call log entry to the at least the first one of the plurality of communication devices.

16. The method of claim 15, wherein the transferred communication ends and further comprising:
updating the call log entry to indicated that the transferred communication ended; and
resending the updated call or updated call log entry with the end of the transferred communication to the plurality of communication devices.

17. The system of claim 11, further comprising:
receiving a request to override the updating of the call log; and
not send the updated call log or the updated call log entry to the plurality of communication devices in response to receiving the request to override the updating of the call log.

18. The method of claim 11, wherein the event associated with the call log entry is based on a received Session Initiation Protocol (SIP) PUBLISH message and wherein sending the updated call log is accomplished by sending a plurality of SIP NOTIFY messages.

19. A method comprising
receiving, by a processor, a forked request to establish a communication at a communication device, wherein the communication device is one of a plurality of communication devices associated with a common Address of Record (AoR) of a user of the communication device;
storing, by the processor, the request to establish the communication in a call log entry in a call log, wherein the request to establish the communication is for an answered communication with a first one of the plurality of communication devices;
receiving, by the processor, an event associated with the call log entry, wherein the event associated with the call log entry is identifying that a second communication device of the plurality of communication devices has bridged onto the communication;
and
sending the updated call log to at least another one of the plurality of communication devices associated with the AoR, wherein updating the call log entry in the call log comprises updating the call log entry to indicate the second communication device of the plurality of communication devices has bridged onto the communication.

20. The method of claim 19, wherein the second communication device bridges into the communication based on the forked request.

* * * * *